(12) United States Patent
Matsuno

(10) Patent No.: US 6,945,347 B2
(45) Date of Patent: Sep. 20, 2005

(54) DRIVE POWER CONTROLLER FOR HYBRID VEHICLE

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/989,404

(22) Filed: Nov. 17, 2004

(65) Prior Publication Data

US 2005/0103551 A1 May 19, 2005

(30) Foreign Application Priority Data

Nov. 18, 2003 (JP) ........................................ 2003-388155

(51) Int. Cl.⁷ ............................................. B60K 17/35
(52) U.S. Cl. ..................... 180/242; 180/65.2; 180/245; 701/69
(58) Field of Search ................................. 180/242, 243, 180/245, 65.2; 701/69, 80, 81, 82, 89, 72, 79

(56) References Cited

U.S. PATENT DOCUMENTS

| 4,335,429 | A | * | 6/1982 | Kawakatsu | ................. | 701/102 |
| 5,014,809 | A | * | 5/1991 | Matsuda | ..................... | 180/248 |
| 5,058,700 | A | * | 10/1991 | Shibahata | .................. | 180/245 |
| 5,327,987 | A | * | 7/1994 | Abdelmalek | ............... | 180/65.2 |
| 5,742,917 | A |   | 4/1998 | Matsuno |   |   |
| 6,041,877 | A | * | 3/2000 | Yamada et al. | ............ | 180/65.2 |
| 6,332,504 | B1 | * | 12/2001 | Adds | ......................... | 180/65.2 |
| 6,492,785 | B1 | * | 12/2002 | Kasten et al. | ................ | 318/434 |
| 6,497,301 | B2 | * | 12/2002 | Iida et al. | .................... | 180/249 |
| 6,556,912 | B2 | * | 4/2003 | Matsuno | ...................... | 701/80 |
| 2001/0025219 | A1 | * | 9/2001 | Ohba et al. | ................... | 701/89 |
| 2004/0222029 | A1 | * | 11/2004 | Shigeta et al. | .............. | 180/245 |

FOREIGN PATENT DOCUMENTS

| JP | 8-002274 | 1/1996 |
| JP | 2000-043696 | 2/2000 |
| JP | 2002-014033 | 1/2002 |
| JP | 2002-292648 | 10/2002 |

* cited by examiner

*Primary Examiner*—Tony Winner
(74) *Attorney, Agent, or Firm*—Smith Gambrell & Russell LLP

(57) ABSTRACT

A drive power from an engine is transferred to front wheel drive systems and rear wheel drive systems via a central differential. A torque distribution ratio between front and rear wheels defined by the central differential is set to one for the front wheels being made too much thereof, with a motor generator being coupled to the rear wheel drive systems. In response to detection signals from various sensors for detecting the running conditions, a drive power control unit controls the additional torque from the motor generator toward the drive torque or regenerative braking torque side, thereby changing the torque distribution ratio between the front and rear wheels. Thus, a degree of flexibility in making a change in the torque distribution between front and rear wheels or between right and left wheels is increased, thereby realizing an all-wheel drivable hybrid vehicle which provides further improved running performance.

15 Claims, 3 Drawing Sheets

$T_{E/G}$ : ENGINE TORQUE
$T_f$ : FRONT WHEEL TORQUE
$T_r$ : REAR WHEEL TORQUE
$t_d$ : TORQUE DISTRIBUTION RATIO ($t_d = T_f/(T_f + T_r)$)

DRIVE POWER CONTROLLER FOR HYBRID VEHICLE

BACKGROUND OF THE PRESENT INVENTION

The present invention relates to a drive power controller for a hybrid vehicle having a motor generator added to a drive system with an engine.

The present application claims priority from Japanese Patent Application No. 2003-388155, the disclosure of which is incorporated herein by reference.

Recently, in a background of environmental and energy-saving issues, attentions are being given to the hybrid vehicle having the motor generator added to the drive system with the engine. The hybrid vehicle of this type selectively couples the motor generator to the engine as a power source for the drive system, thereby providing various modes such as a running mode of using either or both of the engine and the motor generator, a power source braking mode of using either or both of the engine and the motor generator, and an energy regenerative mode of using the motor generator during braking operations. For the hybrid vehicle of this type, developments are being made in an all-wheel drive (AWD) vehicle, which transfers a drive power to both front and rear wheels, in addition to a two-wheel drive vehicle which uses only the front or rear wheels as its drive wheels. Such an AWD vehicle has been proposed which is equipped with a drive power controller for providing a control to a distribution of a torque to the front and rear wheels or the right or left of the front or rear wheels as required.

In Japanese Patent Application Laid-Open No. 2000-43696, an example of such an AWD vehicle is described. The vehicle is not a central differential geared 4WD in which an output torque is transferred from the engine to a central differential via a transmission gear and then to the front and rear wheel drive systems at a distribution ratio defined by the central differential. That is, the motor generator which controllably and variably adds a drive torque or a regenerative braking torque is coupled between the engine and the transmission gear, and the central differential is provided with a differential limiting clutch. The configuration allows the engagement of the differential limiting clutch provided at the central differential to be adjusted, thereby controlling the torque distribution ratio between the front and rear wheels. In accordance with the torque distribution ratio, the total drive torque or the sum of the engine torque and the drive or braking torque from the motor generator is divided to the front and rear wheels.

That is, under the condition in which the clutch for limiting the operation of the central differential is released, the arrangement allows the torque to be distributed to the front and rear wheels at a specific torque distribution ratio (e.g., front wheels:rear wheels=3:7) defined by the gear ratio of the central differential. An adjustment of the clutch engagement allows for variably controlling the torque distribution ratio between the front and rear wheels from the specific torque distribution ratio up to a torque distribution ratio (e.g., front wheels:rear wheels=5:5) at which the clutch is in a direct coupling condition.

According to the aforementioned prior art, it is possible to continuously vary the torque distribution ratio between the front and rear wheels, e.g., from the ratio where the rear wheels has too much of the torque, such as 3:7, to the ratio of 5:5 for the front and rear wheels being in a direct coupling condition. However, it is not possible to continuously vary the torque distribution ratio from the ratio of 5:5 to more than that. However, in order to obtain the optimal torque distribution ratio under various running conditions, for example, the torque distribution which is more than 5:5 to the front wheels ensures a stable running during running straight at a constant speed or on a downhill. If the torque distribution to the rear wheels is made larger, it ensures start and acceleration performances upon an acceleration such as a starting of the vehicle. It is thus required that the torque distribution ratio can be changed in a wide range, for example, from the ratio of less than 5:5 to the ratio of more than 5:5.

Now, suppose that a difference in a rotation occurs between the front and rear wheel output components of the central differential upon cornering or running on a road with a low friction coefficient $\mu$. In this case, the aforementioned prior art allows the clutch to produce a differential limiting torque as required so as to increase the low rotational speed side transfer torque as the differential resisting torque, thereby varying the torque distribution ratio between the front and rear wheels. That is, according to the prior art, the torque cannot be moved between the front and rear wheels in the absence of the difference in a rotational speed between the front and rear wheel output components of the central differential, while the higher rotational speed side torque cannot be increased with the higher rotational speed remaining unchanged. Accordingly, when an active change in the torque distribution ratio is positively attempted between the front and rear wheels on an assumption of various situations to improve running performance, there is a problem in which a limitation to the attempt may occur.

Furthermore, in the aforementioned prior art, the differential limiting clutch restricts differential rotations to make the change in the torque distribution ratio, thereby naturally causing a degradation in a differential function with the change in the torque distribution ratio. That is, the prior art imposes a limitation that the torque distribution ratio cannot be actively changed in a case where the differential function is required. A problem that the limitation compromises the active change in the torque distribution ratio to be made according to various situations may be thus raised, thereby reducing the number of torque distribution control variations.

Now, an attention is focused on the relation between the functionality of the hybrid vehicle coupled with the motor generator and the torque distribution ratio control. In the aforementioned prior art, since the differential limiting clutch of the central differential provides a control to the torque distribution ratio, the control is performed separately from the drive or regenerative braking control provided by the motor generator. Accordingly, when the change in the torque distribution ratio is made between the front and rear wheels in connection with the drive and regenerative braking control by the motor generator, the control must be provided for two operations, i.e., the respective controls of the differential limiting clutch and the motor generator, thereby making the control complicated. The prior art cannot be said to be sufficient in terms of an efficient energy utilization because a braking torque produced to change the torque distribution ratio between the front and rear wheels cannot be used for the energy regeneration in the motor generator.

SUMMARY OF THE PRESENT INVENTION

The present invention is proposed to address these problems. It is therefore an object of the present invention to enable a change in a torque distribution ratio between front and rear wheels to be made in a wide range, for example, from the ratio of less than 5:5 to the ratio of more than 5:5. It is another object of the present invention to enable the change in the torque distribution ratio between the front and rear wheels to be made irrespective of a difference in rotation between front and rear wheel output components of a central differential. It is still another object of the present invention to enable the higher rotational speed side torque to be increased with the higher rotational speed remaining unchanged. It is a further object of the present invention to enable an active change in the torque distribution ratio between the front and rear wheels to be made while the differential function of the central differential is being assured. It is still another object of the present invention to control the torque distribution ratio in connection with the control of the motor generator, thereby improving an efficient energy utilization upon making the change in the torque distribution ratio between the front and rear wheels as a function of the hybrid vehicle. It is still another object of the present invention to realize an all-wheel drivable hybrid vehicle which can offer a good running performance by providing a higher degree of flexibility in making a change in the torque distribution ratio between the front and rear wheels.

The present invention has the following features in order to achieve these objects.

According to a first aspect of the present invention, a drive power controller for a hybrid vehicle comprises an engine, a central differential for defining a torque distribution ratio at which a drive power from the engine is transferred to front and rear wheels, a motor generator added to drive systems with the engine, and a drive power control unit for controlling the engine and the motor generator. The motor generator is coupled to one of the drive systems for the front and rear wheels, so that a change in the torque distribution ratio between the front and rear wheels is made in accordance with any of drive power and regenerative braking power added by the motor generator.

According to a second aspect of the present invention, in the aforementioned drive power controller, the motor generator is coupled to the rear wheel drive system. The torque distribution ratio defined by the central differential as the torque distribution ratio for the front wheels has too much of the torque.

According to a third aspect of the present invention, the aforementioned drive power controller for the hybrid vehicle controls the drive power from the motor generator coupled to the rear wheels to be added when the hybrid vehicle is detected to be accelerated.

According to a fourth aspect of the present invention, the aforementioned drive power controller for the hybrid vehicle controls the drive power from the motor generator coupled to the rear wheels to be added when the hybrid vehicle is detected to be in under-steering conditions.

According to a fifth aspect of the present invention, the aforementioned drive power controller controls the drive power from the motor generator coupled to the rear wheels to be added, and further the drive power provided by the engine to be reduced in response to the drive power added by the motor generator.

According to a sixth aspect of the present invention, the aforementioned drive power controller for the hybrid vehicle controls the regenerative braking power from the motor generator coupled to the rear wheels to be added when the hybrid vehicle is detected to be braked.

According to a seventh aspect of the present invention, the aforementioned drive power controller for the hybrid vehicle controls the regenerative braking power from the motor generator coupled to the rear wheels to be added when the hybrid vehicle is detected to be in over-steering conditions.

According to an eighth aspect of the present invention, the aforementioned drive power controller for the hybrid vehicle controls the regenerative braking power from the motor generator coupled to the rear wheels to be added, and further the drive power provided by the engine to be increased in response to the regenerative braking power added by the motor generator.

According to a ninth aspect of the present invention, the aforementioned drive power controller for the hybrid vehicle further comprises a pair of clutches provided on either the front wheel drive system or the rear wheel drive system coupled with the motor generator. The clutches are controllable for coupling with each of right and left drive shafts. The drive power or the regenerative braking power added by the motor generator is divided to either right or left drive shaft via the pair of clutches, so that the torque distribution of right and left wheels can be adjusted.

According to a tenth aspect of the present invention, the aforementioned drive power controller for the hybrid vehicle controls the drive power from the motor generator coupled to the rear wheels to be added when the hybrid vehicle is detected to be in under-steering conditions, in which an outer wheel is directly connected when negotiating a corner, to allow an inner wheel to slip.

According to an eleventh aspect of the present invention, the aforementioned drive power controller for the hybrid vehicle controls the regenerative braking power from the motor generator coupled to the rear wheels to be added when the hybrid vehicle is detected to be in over-steering conditions, in which the inner wheel is directly connected to allow the outer wheel to slip.

According to a twelfth aspect of the present invention, the aforementioned drive power controller controls the drive power from the motor generator coupled to the rear wheels to be added when the hybrid vehicle is detected to be in over-steering conditions, in which the outer wheel is directly connected to the clutch to allow the inner wheel to slip.

According to a thirteenth aspect of the present invention, in the aforementioned drive power controller for the hybrid vehicle, the motor generator is coupled to the front wheel drive system, and the drive power control unit controls the regenerative braking power from the motor generator to be added when the hybrid vehicle is detected to be in under-steering conditions.

According to a fourteenth aspect of the present invention, the aforementioned drive power controller for the hybrid vehicle controls the drive power from the motor generator to be added when the hybrid vehicle is detected to be in over-steering conditions.

According to a fifteenth aspect of the present invention, the motor generator is coupled to the front wheel drive, in which the aforementioned drive power controller controls the regenerative braking power from the motor generator coupled to the front wheels to be added when the hybrid vehicle is detected to be in under-steering conditions. Then, the inner wheel is directly connected to allow the outer wheel to slip.

The drive power controller for the hybrid vehicle according to the present invention provides the following operations.

First, according to the drive power controller for the hybrid vehicle in the first aspect, the torque distribution ratio between the front and rear wheels is set to the torque distribution ratio defined by the central differential, and the motor generator is coupled to one of the drive systems to add the torque. Accordingly, a decrease or an increase in the torque is caused only on the side coupled with the motor generator, thereby allowing the torque distribution ratio between the front and rear wheels to be continuously changed. For example, it is possible to change continuously from the torque distribution ratio defined by the central differential for one side being made too much of the torque, to a torque distribution ratio for the other side being made too much of the torque via 5:5 of ratio. Accordingly, a wide range of adjustment of torque distribution control is made available, thereby enabling an optimal torque distribution ratio to be obtained in response to various running conditions.

Furthermore, an addition of torque from the motor generator allows the torque distribution ratio between front and rear wheels to be changed, thereby enabling the increase or the decrease in total drive torque as well as the change in the torque distribution ratio only by the motor generator to be controlled. Accordingly, for example, suppose that the torque distribution ratio for the front wheels being made too much thereof is defined by the central differential, with the motor generator being coupled to the rear wheel drive system. In this case, the addition of torque from the motor generator causes the increase in the total drive torque as well as an immediate change in the torque distribution ratio of the front wheels being made too much thereof. Thus, by controlling only the motor generator, it is possible to provide the drive control which quickly realizes sports running involving a hard acceleration at a stabilized torque distribution ratio.

Furthermore, the change in the torque distribution ratio is made irrespective of the difference in rotation between the front and rear wheel output components of the central differential. It is thus possible to make an active change in the torque distribution ratio between the front and rear wheels on the assumption of various situations to improve running performance. Furthermore, the torque on the higher rotational speed side of the front and rear wheels can be increased with the higher rotational speed remaining unchanged, and divided to the right and left wheels so as to control the torque distribution ratio between the right and left wheels without providing an additional differential or acceleration gear.

Furthermore, the change in the torque distribution ratio between front and rear wheels is made without limiting the differential function of the central differential. Accordingly, even when the differential function of the central differential is required, an active change in the torque distribution ratio can be made, thereby providing a wide range of variations for the torque distribution control.

As a function of the hybrid vehicle, the drive power can be easily controlled in response to the running condition of the vehicle because only the motor generator is controlled in order to control the torque distribution ratio and the increase or the decrease in total drive torque provided by controlling the drive or regenerative braking of the motor generator. From another point of view, the change in the torque distribution ratio is made in combination with the driving or regenerative braking of the motor generator. Thus, the braking torque necessary for the change in the torque distribution ratio is utilized for regenerating the energy of the motor generator, thereby improving the efficient energy utilization.

Now, according to the drive power controller for the hybrid vehicle in the second or third aspect, in addition to the aforementioned operation, the torque distribution ratio for the front wheels being made too much thereof is defined by the central differential in which the motor generator is coupled to the rear wheel drive system. This configuration allows the torque distribution ratio set for the front wheels being made too much thereof to that for the rear wheels being made too much thereof to be continuously changed via 5:5 of the front wheel. When the hybrid vehicle is detected to be accelerated, the drive power from the motor generator is controlled to be added. Thus, it is possible to ensure a stabilized running condition at the torque distribution ratio for the front wheels being made too much thereof when the vehicle travels in normal or uniform linear running condition. On the other hand, during an acceleration, the vehicle can quickly increase the total drive torque to change the torque distribution ratio between the front and rear wheels to that for the rear wheels being made too much thereof. Accordingly, it is possible to improve both response ability and running stability during the acceleration.

According to the drive power controller in the fourth aspect, in addition to the aforementioned operation, the motor generator coupled to the rear wheel drive system is controlled to provide the drive power when the hybrid vehicle is detected to be in under-steering conditions, thereby allowing the rear wheel drive torque to be increased for the correction. Therefore, cornering and acceleration performances can be improved.

According to the drive power controller in the fifth aspect, in addition to the aforementioned operation, the drive power provided by the engine is reduced in response to the drive power added by the motor generator, thereby providing an appropriate acceleration performance in response to the operating condition of the accelerator.

According to the drive power controller in the sixth aspect, in addition to the aforementioned operation, the drive power control unit controls the regenerative braking power from the motor generator coupled to the rear wheels to be added when the hybrid vehicle is detected to be braked. For example, such a control allows the total drive torque to be decreased as well as to set the torque distribution ratio between the front and rear wheels back to that for the front wheels being made too much thereof immediately in response to the braking request after the aforementioned acceleration, further enabling the regeneration of an excessive amount of energy. Thus, it is possible to improve both the response ability and the running stability during the braking.

According to the drive power controller in the seventh aspect, in addition to the aforementioned operation, the motor generator coupled to the rear wheel drive system is operated to provide the regenerative braking power when the hybrid vehicle is detected to be in over-steering conditions. Thus, it is possible to regenerate an excessive amount of the drive power energy as well as to reduce the rear wheel drive torque for correction, so that the improved running stability can be provided.

According to the drive power controller in the eighth aspect, in addition to the aforementioned operation, the drive power provided by the engine is increased in response to the regenerative braking power added by the motor generator, thereby providing an appropriate deceleration performance in response to the operating condition of the accelerator pedal.

According to the drive power controller in the ninth aspect, in addition to the aforementioned operation, the torque added to only one of the front and rear wheels by the motor generator can be divided to the right and left wheels by a pair of clutches which can control the coupling condition with the respective right and left drive shafts, thereby being able to adjust the braking or driving torque distribution between the right and left wheels.

According to the drive power controller in the tenth aspect, when the hybrid vehicle is detected to be in under-steering conditions, the drive power control unit controls the motor generator coupled to the rear wheels to add the drive power, and the outer wheel for cornering is directly connected to the clutch to allow the inner wheel thereof to slip. Thus, a relative increase of the drive power for the outer wheel is provided, so that a yaw moment in a steering direction can be added to the vehicle.

According to the drive power controller in the eleventh aspect, in addition to the aforementioned operation, when the hybrid vehicle is detected to be in over-steering conditions, the drive power control unit controls the motor generator coupled to the rear wheels to add the regenerative braking power, and also the inner wheel is directly connected to allow the outer wheel to slip. Therefore, a relative increase to the braking power is provided for the inner wheel, so that a reverse yaw moment in a reverse direction of the steering direction can be applied to the vehicle.

According to the drive power controller in the twelfth aspect, in addition to the aforementioned operation, when the hybrid vehicle is detected to be in over-steering conditions, the drive power control unit controls the motor generator coupled to the rear wheels to add the drive power, and the outer wheel is directly connected to allow the inner wheel to slip. Therefore, a relative increase to the braking power is provided for the outer wheel to add the reverse (stable) yaw moment to the vehicle.

According to the drive power controller in the thirteenth aspect, suppose that, for example, the torque distribution ratio for the rear wheels being made too much thereof is defined by the central differential and the motor generator is coupled to the front wheel drive system. When the hybrid vehicle is detected to be in under-steering conditions, the drive power control unit controls the motor generator coupled to the front wheel drive system to add the regenerative braking power to reduce the front wheel drive torque for correction, thereby making it possible to improve the cornering performance and regenerate an excessive amount of a drive power energy.

According to the drive power controller in the fourteenth aspect, in connection with the aforementioned operation, the motor generator coupled to the front wheel drive system is operated to provide the drive power when the hybrid vehicle is detected to be in over-steering conditions. Thus, the front wheel drive torque is increased to provide further cornering stability.

According to the drive power controller in the fifteenth aspect, when the hybrid vehicle is detected to be in under-steering conditions, the drive power control unit controls the motor generator coupled to the front wheels to add the regenerative braking power, and to improve the cornering ability of the inner wheel to allow the outer wheel to slip. Thus, the relative increase to the braking power is provided for cornering the inner wheel to add the yaw moment in the steering direction to the vehicle.

The drive power controller for the hybrid vehicle according to the present invention has the aforementioned features, thereby providing the following effects.

One of the effects is to enable the change in the torque distribution ratio between the front and rear wheels to be made in the wide range from the torque distribution for the front wheels being made too much thereof to the torque distribution of less than 5:5. Furthermore, the change in the torque distribution ratio between the front and rear wheels can be made freely irrespective of the speed difference between the front and rear wheels by the central differential. Thus, the active change in the torque distribution ratio between the front and rear wheels can be made for various situations to improve the running performance.

Furthermore, the torque of the higher rotational speed can be increased with the higher rotational speed remaining unchanged, and be divided to the right and left wheels, thereby controlling the torque distribution ratio between the right and left wheels without providing an additional differential or another acceleration gear. It is also possible to make an active change in the torque distribution ratio between the front and rear wheels while the differential function of the central differential is being assured.

Furthermore, as a function of the hybrid vehicle, it is also possible to easily control the torque distribution ratio in connection with the control of the motor generator, thereby improving the efficient energy utilization upon making a change in the torque distribution ratio between front and rear wheels.

Finally, these features can provide an increased degree of flexibility in making a change in the torque distribution between the front and rear wheels or the right and left wheels, thereby realizing an all-wheel drivable hybrid vehicle which further provides the improved running performance.

BRIEF DESCRIPTION OF THE DRAWINGS

These and other objects and advantages of the present invention will become understood from following descriptions with reference to accompanying drawings, wherein.

DETAILED DESCRIPTION OF THE PREFERRED EMBODIMENTS

Now, a drive power controller for a hybrid vehicle according to the present invention will be described below with reference to accompanying drawings.

[First Embodiment]

Figure 1:
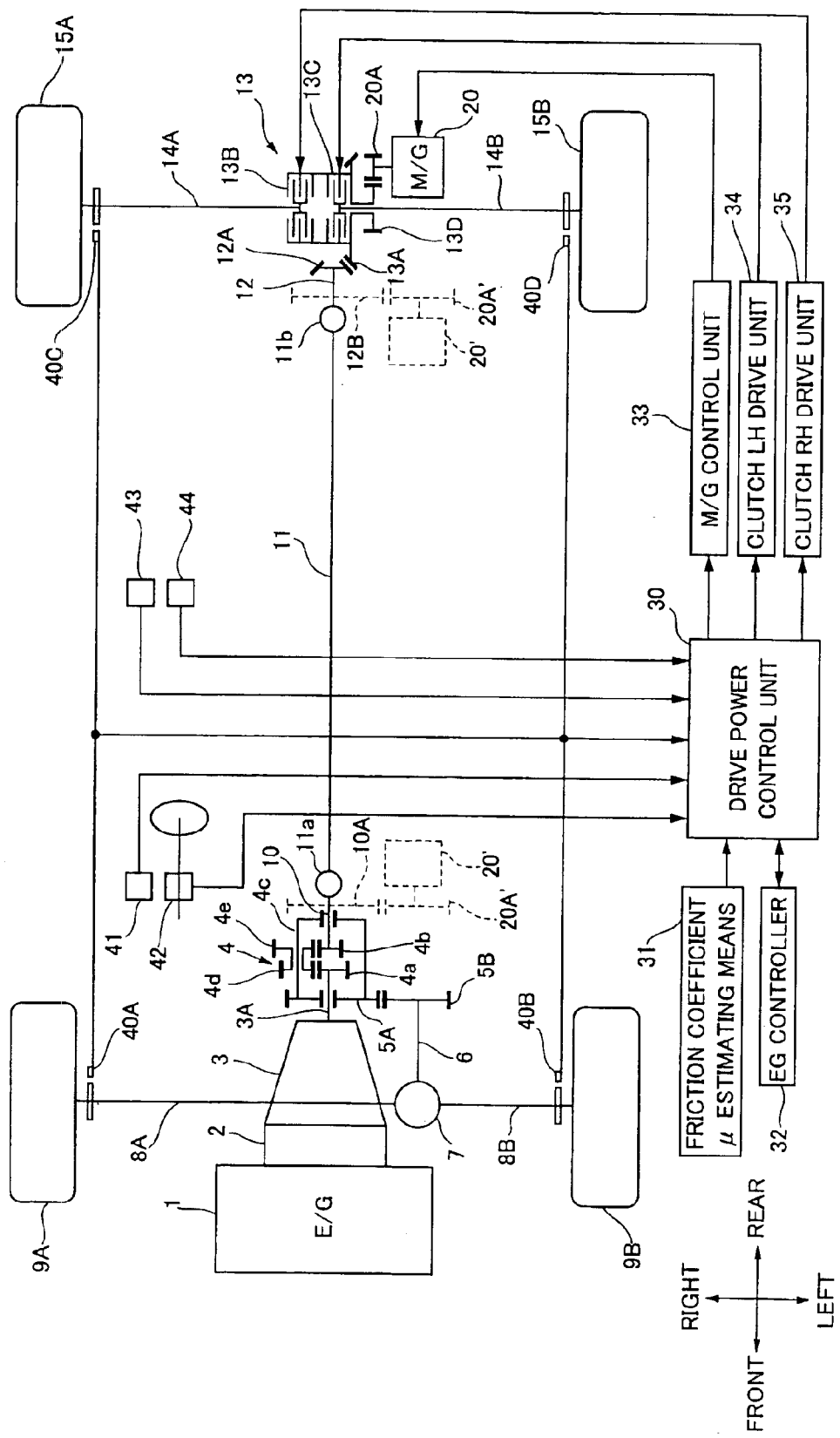
FIG. 1 is an explanatory view showing a first embodiment according to the present invention.

FIG. 1 is an explanatory view showing a system configuration according to a first embodiment.

Now, an explanation is given to the drive system of a vehicle, in which a power delivered from an engine 1 is supplied to a central differential 4 via an electromagnetic clutch 2 and a transmission 3. In the embodiment, the central differential 4 is a differential power transmission gear of a complex planetary gear train which includes a first sun gear 4a formed on a transmission output shaft 3A, a second sun gear 4b formed on a rear wheel drive shaft 10, and first and second pinions 4d and 4e held with a carrier 4c around the first and second sun gears 4a and 4b. The power supplied from the transmission output shaft 3A to the first sun gear 4a is transferred to the carrier 4c and the second sun gear 4b at a torque distribution ratio defined by gear dimensions of the aforementioned complex planetary gear train. The power is further transferred from the carrier 4c to a front wheel drive shaft 6 via reduction gears 5A and 5B and to the rear wheel drive shaft 10 from the second sun gear 4b.

The torque distribution between the front and rear wheels defined by the central differential 4 is as shown in the following equations (1-1) and (1-2);

$$T_{f0} = (1 - \beta/\alpha) T_i \quad (1\text{-}1)$$

$$T_{r0} = (\beta/\alpha) T_i \quad (1\text{-}2)$$

where $T_i$ is the input torque to the first sun gear 4a, $T_{f0}$ is the front wheel torque in the carrier 4c, $T_{r0}$ is the rear wheel torque of the second sun gear 4b, $\alpha = Z_{s1}/Z_{p1}$ (in which $Z_{s1}$ is the number of teeth of the first sun gear 4a, and $Z_{p1}$ is the number of teeth of the first pinion 4d), and $\beta = Z_{s2}/Z_{p2}$ (in which $Z_{s2}$ is the number of teeth of the second sun gear 4b, and $Z_{p2}$ is the number of teeth of the second pinion 4e).

That is, the torque distribution ratio $T_{f0}:T_{r0}$ defined by the central differential 4 can be freely set by changing, as appropriate, the number of teeth of the first and second sun gears 4a and 4b and the first and second pinions 4d and 4e. In the embodiment, the torque distribution ratio is set at that for the front wheels being made too much thereof or for the front wheels being provided a higher torque, e.g., 6:4.

A front wheel drive system includes the reduction gears 5A and 5B, the front wheel drive shaft 6, a front wheel final reduction gear 7, a front right wheel drive shaft 8A, and a front left wheel drive shaft 8B, in which the power is transferred to front wheels 9A and 9B.

On the other hand, a rear wheel drive system includes the rear wheel drive shaft 10, a propeller shaft 11 (with its joints 11a and 11b) and a rear wheel drive shaft 12, and is designed such that a bevel transmission gear 12A formed on the rear wheel drive shaft 12 engages a bevel transmission gear 13A formed on a twin clutch 13 to transfer the power to the twin clutch 13, and a right wheel drive shaft 14A and a left wheel drive shaft 14B for driving rear wheels 15A and 15B are coupled to coupling portions 13B and 13C of the twin clutch 13.

Furthermore, in the first embodiment, a motor generator 20 is coupled to the rear wheel drive system corresponding to the aforementioned torque distribution ratio defined for the front wheels being made too much thereof. This means that the motor generator 20 is coupled to the drive system to which a less amount of torque is distributed according to the torque distribution ratio defined by the central differential 4. In the example of FIG. 1, an input gear 20A of the motor generator 20 engages an input gear 13D formed on the twin clutch 13; however, the present invention is not limited thereto. As shown by dashed lines in FIG. 1, an input gear 20A' of a motor generator 20 may engage input gears 10A or 12B formed on the rear wheel drive shaft 10 or 12, respectively.

Now, a drive power control system thereof will be described below. A drive power control unit 30 for controlling the drive power is supplied with detection signals obtained from various sensors for sensing the running conditions of the vehicle. As required, the drive power control unit 30 is also supplied with an output signal from friction coefficient calculating means 31 for estimating a friction coefficient of a road traveled or with an output signal from an engine controller 32 for controlling the operating conditions of the engine 1. Based on these inputs, computed results are obtained and delivered from the drive power control unit 30. In response to the output signals, a motor generator control unit 33, a clutch LH drive unit 34, and a clutch RH drive unit 35 output the control signals, by which the additional torque from the motor generator 20 and the coupling condition of the coupling portions 13B and 13C of the twin clutch 13 are controlled.

In the arrangement, for example, various sensors for sensing the running conditions of the vehicle include wheel speed sensors 40A, 40B, 40C, and 40D which are provided at the front wheels 9A and 9B, and the rear wheels 15A and 15B, respectively. Further included are an accelerator sensor 41 and a steering wheel angle sensor 42 to detect the operating conditions of the accelerator and a steering wheel. Also included are a yaw rate sensor 43 and a lateral acceleration sensor 44 to detect the behavior of the vehicle. These sensors are shown only for examples and the present invention is not limited thereto.

Now, the operation of such a drive power control system will be described below.

[A Control Over the Torque Distribution Between Front and Rear Wheels]

In the embodiment, the central differential 4 defines a torque distribution ratio for the front wheels being made too much thereof (e.g., front wheel:rear wheel=6:4), with the motor generator 20 being coupled to the rear wheel side drive system relative to the central differential 4. Accordingly, the total drive torque is increased or decreased by the motor generator 20, a drive torque or a regenerative braking torque, and at the same time the motor generator 20 operates to add the drive torque or the regenerative braking torque only to the rear wheels, thereby allowing a change to be made in the torque distribution ratio between the front and rear wheels.

Figure 2:
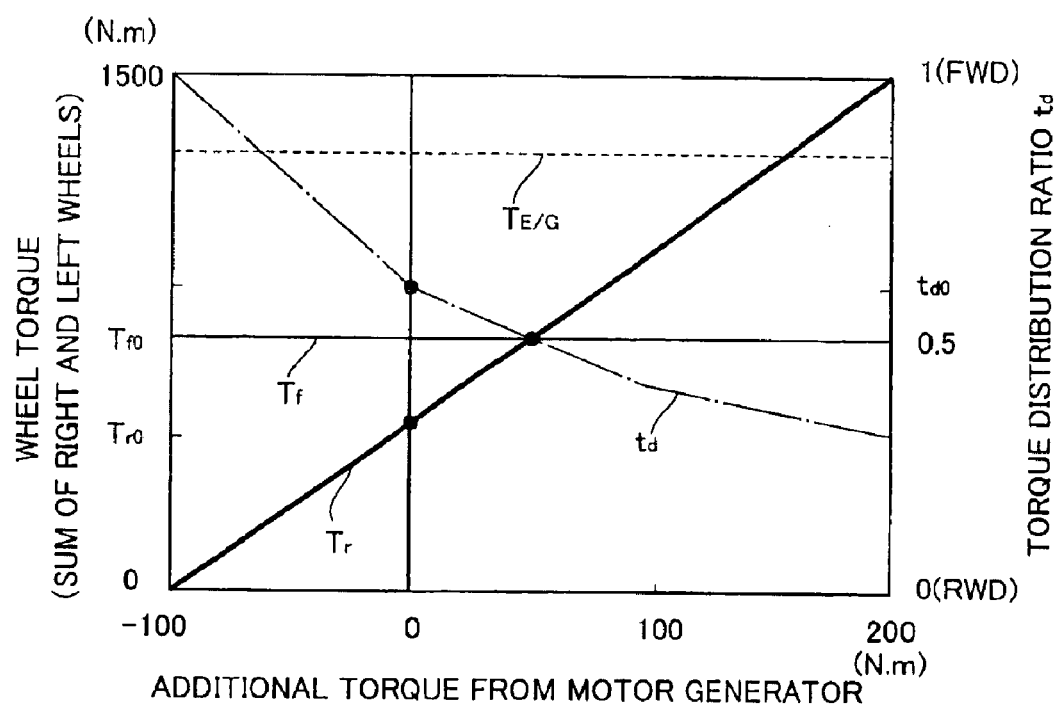
FIG. 2 is a graph showing a torque distribution control operation according to the first embodiment of the present invention.

FIG. 2 is a graph showing an example of the torque distribution control provided by the motor generator 20. In the example, engine torque $T_{E/G}$ is constant. When the torque added by the motor generator 20 is zero, wheel torques $T_f$ and $T_r$ for the front and rear wheels are at a torque distribution ratio ($T_{f0}:T_{r0}$) for the front wheels being made too much thereof, in the case of which the engine torque $T_{E/G}$ is provided at a torque distribution ratio $t_{d0}$ (where $T_f/(T_f+T_r)=0.6$) defined by the central differential 4.

An increase in the torque added by the motor generator 20 toward the drive torque (positive side) would correspondingly cause an increase only in the rear wheel torque $T_r$. In this case, a further increase in the torque beyond $T_r = T_f$ (a torque distribution ratio of 0.5) would cause the torque distribution ratio $t_d$ to be below 0.5, thereby allowing the torque distribution ratio to be changed to that for the rear wheels being made too much thereof.

On the other hand, the increase in the torque added by the motor generator 20 toward the regenerative braking torque (negative side) would correspondingly cause the rear wheel torque $T_r$ to gradually decrease from $T_{r0}$ and the torque distribution ratio for the front wheels being made too much thereof to be further increased. At the rear wheel torque $T_r$ equal to zero, the front wheel drive (FWD) can be realized at the torque distribution ratio of $t_d = 1$.

That is, the control of the torque distribution between the front and rear wheels by the motor generator 20 enables a wide range of the changes in the torque distribution to be made from the torque distribution ratio $t_d = 1$ for the front wheel drive (FWD) condition to that for the rear wheels being made too much thereof via the torque distribution ratio $t_d = 0.5$ for the 5:5.

Now, an example of control provided by the drive power control unit 30 will be described below, which makes use of such a wide range of the changes in the torque distribution.

First, during a normal straight running nearly at a constant speed, the motor generator 20 adds no torque to maintain the torque distribution ratio $t_{d0}$ for the front wheels being made too much thereof, thereby ensuring stabilized running during the straight running. When the detection signals from the aforementioned various sensors show that the vehicle is to be accelerated, the additional torque from the motor generator 20 is increased toward the drive torque, thereby increasing the total drive torque as well as changing the torque distribution ratio between the front and rear wheels to that for the rear wheels being made too much thereof. Thus, it is possible to quickly realize a sports running which requires a hard acceleration resulting from an increase in total drive torque, and further to ensure running stability during the sports running through shifting the torque distribution ratio between the front and rear wheels to that for the rear wheels being made too much thereof.

During such a sports running, when the detection signals from the aforementioned various sensors show that the vehicle is to be braked, the additional torque from the motor generator 20 is immediately switched to the regenerative braking torque. Thus, the total drive torque can be reduced as well as the torque distribution ratio between the front and rear wheels to be shifted to that for the front wheels being made too much thereof. It is thus possible to ensure response ability and running stability during braking operations and allow an excessive amount of the torque to be used for the energy regeneration by the motor generator 20.

Furthermore, when the detection signals from the aforementioned various sensors have detected that the vehicle's behavior is in under-steering conditions during cornering, the additional torque from the motor generator 20 is increased toward the drive torque, thereby increasing the total drive torque as well as changing the torque distribution ratio between the front and rear wheels to that for the rear wheels being made too much thereof. Thus, the rear wheel drive torque is increased for the correction, thereby improving the cornering performance of the vehicle which is in under-steering conditions, and also the total drive torque is increased, thereby improving the acceleration performance thereupon.

When the detection signals from the aforementioned various sensors have detected that the vehicle's behavior is in over-steering conditions during cornering, the additional torque from the motor generator 20 is operated toward the regenerative braking torque. In other words, the rear wheel drive torque is decreased for the correction, thereby normalizing the behavior of vehicle which is in over-steering conditions, so that an improved running stability can be provided during cornering, and further the excessive amount of the drive power energy can be regenerated.

An advantage of such control is that only the additional torque from the motor generator 20 is controlled in order to increase or decrease the total drive torque and change the torque distribution ratio based on the detection of the conditions of the acceleration or braking or the vehicle's behavior during cornering (conditions of under-steering or over-steering). When the differential limiting clutch of the central differential is used to control the torque distribution ratio like the aforementioned prior art, the total drive torque needs to be separately controlled; however, according to the embodiment of the present invention, it is sufficient to control only the motor generator 20, thereby simplifying the control operation.

In the aforementioned description, such an example as the total drive torque was increased or decreased at the same time was illustrated. However, when only the torque distribution ratio between the front and rear wheels is desired to be changed without increasing or decreasing the total drive torque, a control signal is sent from the drive power control unit 30 to the engine controller 32 to increase or decrease the engine output in combination with the additional torque from the motor generator 20. In this case, the improvement in a fuel consumption can be expected.

[Control Over Right and Left Wheel Drive Power During Cornering]

As described above, on the rear wheel side to which the motor generator 20 is coupled, the embodiment allows the power to be transferred to the right and left wheels via the twin clutch 13, which can control the coupling condition, without providing a final reduction gear having a differential function. The right and left coupling portions 13B and 13C of the twin clutch 13 are differently coupled for the drive power or the regenerative braking power added by the motor generator 20, thereby adjusting the torque distribution for the braking power or the drive power between the right and left wheels.

The coupling state of the coupling portions 13B and 13C of the twin clutch 13 is controlled with the control signals from the clutch LH drive unit 34 and the clutch RH drive unit 35 in response to the output from the drive power control unit 30. That is, the drive power control unit 30 controls the motor generator control unit 33 as well as the clutch LH drive unit 34 and the clutch RH drive unit 35, thereby controllably dividing the additional torque from the motor generator 20 to the right and left wheels. Now, an example of the control provided by the drive power control unit 30 corresponding to the running condition during cornering will be described below.

First, suppose that the detection signals from the aforementioned various sensors show that the vehicle's behavior is in under-steering conditions during cornering. In this case, the additional torque from the motor generator 20 is increased toward the drive torque to increase the total drive torque as well as the torque distribution ratio between the front and rear wheels is changed to that for the rear wheels being made too much thereof under the above-mentioned control. Further, the coupling portion 13B or 13C on the cornering outer wheel side of the twin clutch 13 is directly coupled, and the other coupling portion 13C or 13B on the cornering inner wheel side is slipped.

Thus, a relative increase to the cornering outer wheel side drive power is provided to add a yaw moment in a steering direction to the vehicle which is in under-steering conditions, thereby improving the behavior of vehicle which is in under-steering conditions to enhance the running stability as well as improving the cornering and acceleration performances.

On the other hand, suppose that the detection signals from the aforementioned various sensors show that the vehicle's behavior is in over-steering conditions during cornering. In this case, the additional torque from the motor generator 20 is operated toward the regenerative braking torque to decrease the total drive torque as well as the torque distribution ratio between the front and rear wheels is changed to that for the front wheels being made too much thereof. Further, the coupling portion 13B or 13C on the cornering inner wheel side of the twin clutch 13 is directly coupled, and the other coupling portion 13C or 13B on the cornering outer wheel side is slipped.

Thus, a relative increase to the cornering inner wheel side braking power is provided to add a yaw moment in an anti-steering direction to the vehicle having the over-steering conditions, and further the rear wheel drive torque is decreased for correction, thereby normalizing the vehicle's behavior having the over-steering conditions to improve the running stability during cornering. Furthermore, an excessive amount of drive power energy can be regenerated.

On the other hand, suppose that the detection signals from the aforementioned various sensors have detected that the vehicle's behavior is in over-steering conditions during cornering. In this case, the additional torque from the motor generator 20 is operated toward the drive torque to increase the total drive torque as well as the torque distribution ratio between the front and rear wheels is changed to that for the rear wheels being made too much thereof. Further, the coupling portion 13C or 13B on the cornering outer wheel side of the twin clutch 13 is directly coupled, and the other coupling portion 13B or 13C on the cornering inner wheel side is slipped.

Thus, a relative increase to the cornering outer wheel side drive power is provided to add the yaw moment in the anti-steering direction to the vehicle having the over-steering conditions, and further the rear wheel drive torque is increased for correction to normalize the behavior of the vehicle having the over-steering conditions, thereby providing the stable sports running during cornering.

[Drive Power Control Corresponding to Road-Surface Friction Coefficient]

The coefficient calculating means 31 can use the detection signals (such as a steering wheel angle, vehicle speed, and yaw rate) from the various sensors for sensing the aforementioned running conditions to estimate the friction coefficients based on an equation of motion for lateral motions of the vehicle, and use techniques disclosed, e.g., in Japanese Patent Applications Laid-Open No. Hei 8-2274 and No. 2002-14033.

The drive power control unit 30 uses the estimated friction coefficient $\mu$ to control the additional torque from the motor generator 20 corresponding to the value estimated by the friction coefficient $\mu$ estimating means 31 in accordance with the relation between the predetermined friction coefficient $\mu$ and drive power distribution. In general, if a road has a higher friction coefficient $\mu$, the additional torque from the motor generator 20 is operated toward the drive torque in an attempt to implement a front to rear wheel torque distribution ratio for the rear wheels being made too much thereof as well as to provide an increased total drive torque. On the other hand, if a road has a lower friction coefficient $\mu$, the additional torque from the motor generator 20 is operated toward the regenerative braking torque in an attempt to implement a front to rear wheel torque distribution ratio for the front wheels being made too much thereof as well as to decrease the total drive torque for stabilized running.

Suppose that a wheel is detected to be slipping from each wheel speed of the front wheels 9A, 9B, 15A, and 15B. In this case, based on the wheel slipping and the vehicle's behavior detected (conditions of under-steering or over-steering), the control is provided to the torque distribution to stabilize the vehicle's behavior. At this time, when the total drive power needs not to be increased by the additional torque from the motor generator 20, the output from the engine controller 32 is used to reduce the engine output, thereby providing required braking power.

[Second Embodiment]

Figure 3:
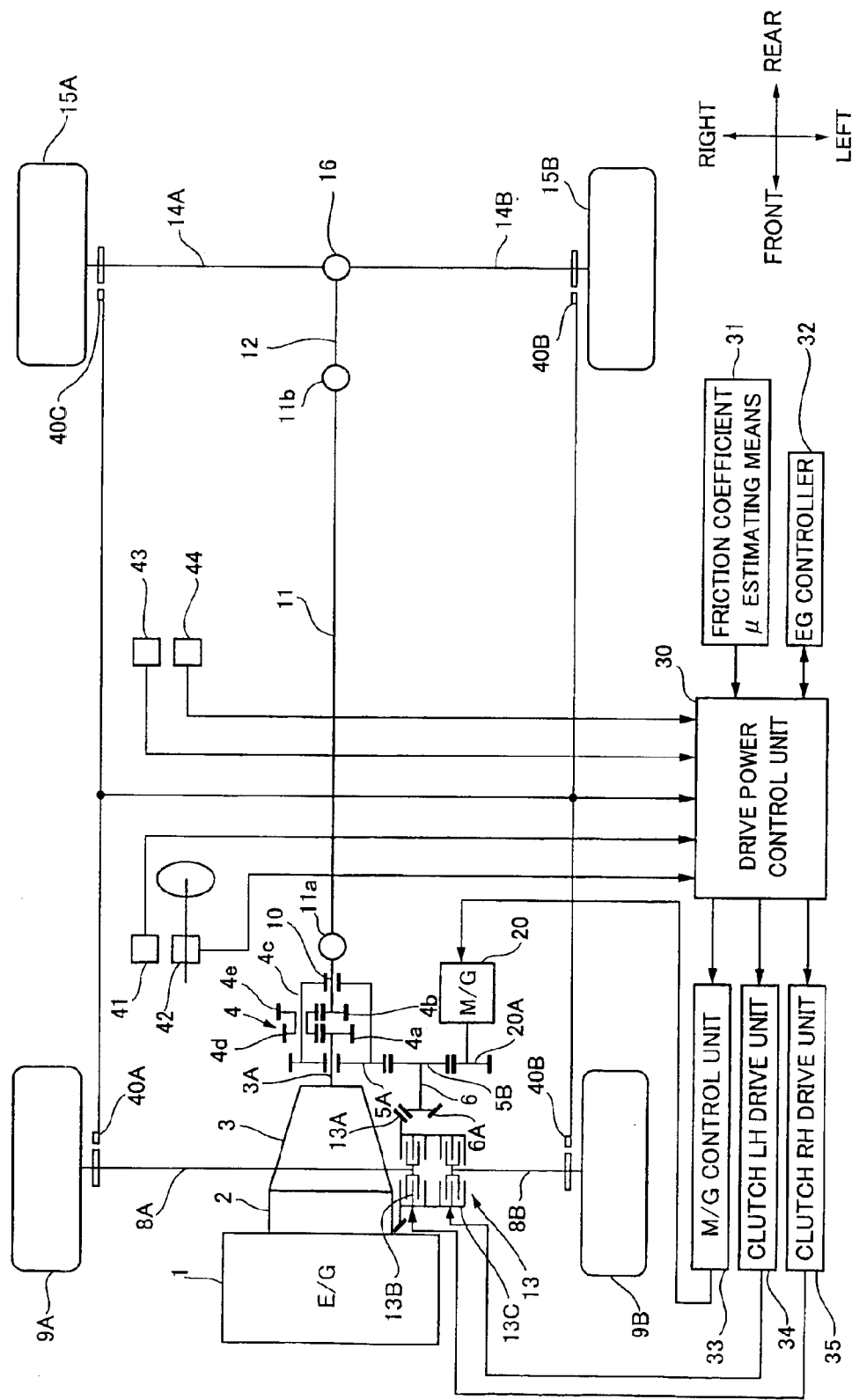
FIG. 3 is an explanatory view showing a second embodiment according to the present invention.

FIG. 3 is an explanatory view showing a second embodiment according to the present invention. The embodiment uses the motor generator 20 coupled to the front wheel side drive system relative to the central differential 4. Additionally, the aforementioned twin clutch 13 is provided for the front right wheel drive shaft 8A and the front left wheel drive shaft 8B, while a rear wheel final reduction gear 16 is provided for the rear right wheel drive shaft 14A and the rear left wheel drive shaft 14B. The same components as those of the aforementioned first embodiment are indicated with the same symbols and will not be repeatedly explained.

In the second embodiment, the torque distribution ratio $T_{f0}: T_{r0}$ defined by the central differential 4 is set at that for the rear wheels being made too much thereof or for the rear wheels being provided a higher torque, e.g., front wheel ratio:rear wheel ratio=4:6. The additional torque from the motor generator 20 coupled to the front wheel drive system is operated toward the drive torque, thereby allowing the torque distribution ratio between the front and rear wheels to be changed from a torque distribution ratio for the rear wheels being made too much thereof to one for the front wheels being made too much thereof via 5:5.

That is, according to the embodiment, the control of the torque distribution between the front and rear wheels by the motor generator 20 enables a wide range of the changes in the torque distribution to be made from the torque distribution ratio for the front wheels being made too much thereof to the torque distribution ratio $t_d=0$ for the rear wheel drive (RWD) condition via a torque distribution ratio $t_d=0.5$ for the 5:5.

Now, an example of control provided by the drive power control unit 30 in the second embodiment is described below, which makes use of such a wide range of the changes in the torque distribution. For example, when the aforementioned various sensors have detected that the vehicle is in under-steering conditions, the additional torque from the motor generator 20 coupled to the front wheel drive system is operated toward the regenerative braking torque. Thus, it is possible to reduce the front wheel drive torque for correction to improve the cornering performance and regenerate an excessive amount of the drive power. On the other hand, when the vehicle is detected to be in over-steering conditions, the additional torque from the motor generator 20 is operated toward the drive torque. Thus, the front wheel drive torque is increased for correction to provide improved running stability.

When the under-steering or over-steering conditions has been detected, the control can also be provided so that one of the cornering outer and inner wheel sides of the twin clutch 13 is directly coupled and the other is slipped to add the yaw moment in the anti-steering direction to the vehicle, thereby normalizing the vehicle's behavior.

The operations and effects of the drive power controller for the hybrid vehicle according to the first and second embodiments are summarized as follows.

(1) The wide range of the changes in the torque distribution ratio between the front and rear wheels can be made from the torque distribution for the front wheels being made too much thereof to one for the rear wheels being made too much thereof via the 5:5. Furthermore, the change in the torque distribution ratio between the front and rear wheels can be made freely irrespective of the difference in rotation between the front and rear wheel output components of the central differential 4. Thus, the active change in the torque distribution ratio between the front and rear wheels can be made on the assumption of the various situations to improve running performance.

(2) The torque on the higher rotational speed side can be increased with the higher rotational speed remaining unchanged, and divided to the right and left wheels, thereby controlling the torque distribution ratio between the right and left wheels by controlling the coupling condition of the twin clutch 13 without providing an additional differential or an acceleration gear. It is also possible to make the active change in the torque distribution ratio between the front and rear wheels while the differential function of the central differential 4 is being assured.

(3) As a function of the hybrid vehicle, controls can be provided to the motor generator 20 as well as to the torque distribution ratio, thereby simplifying the control operations and providing the improved efficient energy utilization upon making a change in the torque distribution ratio between the front and rear wheels.

(4) These operations and effects can provide an increased degree of flexibility in making the change in the torque distribution between the front and rear wheels or the right and left wheels, thereby realizing an all-wheel drivable hybrid vehicle which provides further improved running performance.

While there have been described what are at present considered to be preferred embodiments of the present invention, it will be understood that various modifications may be made thereto, and it is intended that the appended claims cover all such modifications as fall within the true spirit and scope of the present invention.

What is claimed is:

1. A drive power controller for a hybrid vehicle, comprising:

an engine;

a central differential for defining a torque distribution ratio for a drive power from the engine to be transferred to front and rear wheels;

a motor generator added to drive systems with the engine; and a drive power control unit for controlling the engine and the motor generator, wherein the motor generator is coupled to one of the drive systems for the front and rear wheels, so that a change in the torque distribution ratio between the front and rear wheels is made in accordance with any of drive power and regenerative braking power added by the motor generator.

2. The drive power controller for the hybrid vehicle according to claim 1, wherein:

the motor generator is coupled to the rear wheel drive system, the torque distribution ratio defined by the central differential being made too much thereof for the front wheels.

3. The drive power controller for the hybrid vehicle according to claim 1, wherein:

the drive power control unit controls the drive power from the motor generator coupled to the rear wheels to be added when the hybrid vehicle is detected to be accelerated.

4. The drive power controller for the hybrid vehicle according to claim 2, wherein:

the drive power control unit controls the drive power from the motor generator coupled to the rear wheels to be added when the hybrid vehicle is detected to be in under-steering conditions.

5. The drive power controller for the hybrid vehicle according to claim 2, wherein:

the drive power control unit controls the drive power from the motor generator coupled to the rear wheels to be added, and the drive power provided by the engine to be reduced in response to the drive power added by the motor generator.

6. The drive power controller for the hybrid vehicle according to claim 2, wherein:

the drive power control unit controls the regenerative braking power from the motor generator coupled to the rear wheels to be added when the hybrid vehicle is detected to be braked.

7. The drive power controller for the hybrid vehicle according to claim 2, wherein:

the drive power control unit controls the regenerative braking power from the motor generator coupled to the rear wheels to be added when the hybrid vehicle is detected to be in over-steering conditions.

8. The drive power controller for the hybrid vehicle according to claim 2, wherein:

the drive power control unit controls the regenerative braking power from the motor generator coupled to the rear wheels to be added, and the drive power provided by the engine to be increased in response to the regenerative braking power added by the motor generator.

9. The drive power controller for the hybrid vehicle according to claim 1, further comprising:

a pair of clutches provided on either the front wheel drive system or the rear wheel drive system coupled with the motor generator, the clutches being controllable for coupling with each of right and left drive shafts, wherein the drive power or the regenerative braking power added by the motor generator is divided to either right or left drive shaft via the pair of clutches, so that the torque distribution of right and left wheels can be adjusted.

10. The drive power controller for the hybrid vehicle according to claim 9, wherein:

the drive power control unit controls the drive power from the motor generator coupled to the rear wheels to be added when the hybrid vehicle is detected to be in under-steering conditions, and an outer wheel for cornering is directly connected to allow an inner wheel to slip.

11. The drive power controller for the hybrid vehicle according to claim 9, wherein:

the drive power control unit controls the regenerative braking power from the motor generator coupled to the rear wheels to be added when the hybrid vehicle is detected to be in over-steering conditions; and an inner wheel for cornering is directly connected to allow an outer wheel to slip.

12. The drive power controller for the hybrid vehicle according to claim 9, wherein:

the drive power control unit controls the drive power from the motor generator coupled to the rear wheels to be added when the hybrid vehicle is detected to be in over-steering conditions; and an outer wheel for cornering is directly connected to allow an inner wheel to slip.

13. The drive power controller for the hybrid vehicle according to claim 1, wherein:

the motor generator is coupled to the front wheel drive system; and the drive power control unit controls the regenerative braking power from the motor generator to be added when the hybrid vehicle is detected to be in under-steering conditions.

14. The drive power controller for the hybrid vehicle according to claim 13, wherein:

the drive power control unit controls the drive power from the motor generator to be added when the hybrid vehicle is detected to be in over-steering conditions.

15. The drive power controller for the hybrid vehicle according to claim 9, wherein:

the motor generator is coupled to the front wheel drive system;

the drive power control unit controls the regenerative braking power from the motor generator coupled to the front wheels to be added when the hybrid vehicle is detected to be in under-steering conditions; and an inner wheel for cornering is directly connected to allow an outer wheel to slip.

* * * * *